(No Model.)
F. L. DECARIE & P. LORD.
COMBINED PIPE COUPLING AND STOP VALVE.
No. 464,620. Patented Dec. 8, 1891.
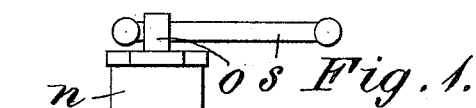
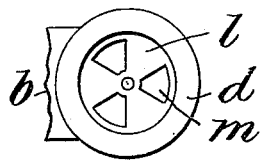
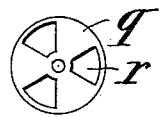
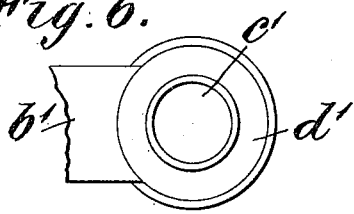
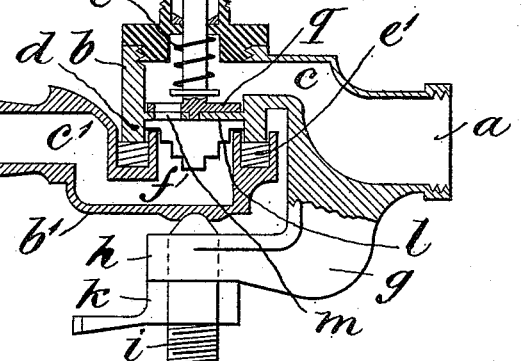
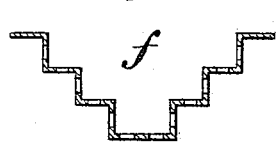
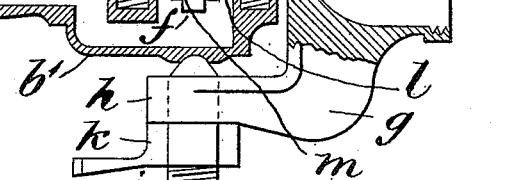
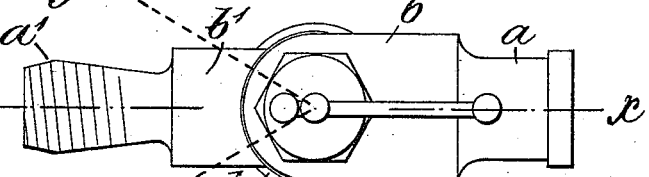
Witnesses.
H. R. Millard
J. Millard
Inventors
Felix Louis Decarie
Peter Lord
By their Attorney Charles G. C. Simpson

United States Patent Office.

FELIX LOUIS DECARIE AND PETER LORD, OF MONTREAL, CANADA, ASSIGNORS TO SAID DECARIE AND JOHN LEE, OF SAME PLACE.

COMBINED PIPE-COUPLING AND STOP-VALVE.

SPECIFICATION forming part of Letters Patent No. 464,620, dated December 8, 1891.

Application filed February 10, 1891. Serial No. 380,922. (No model.) Patented in Canada November 7, 1890, No. 35,381.

*To all whom it may concern:*

Be it known that we, FELIX LOUIS DECARIE and PETER LORD, both subjects of the Queen of Great Britain, and both residing at the city of Montreal, in the District of Montreal and Province of Quebec, Canada, have invented new and useful Improvements in Combined Pipe-Coupling and Stop-Valve, (for which we have obtained a patent of Canada, granted on the 7th day of November, A. D. 1890, No. 35,381;) and we do hereby declare that the following is a full, clear, and exact description of the same.

Our invention relates to combined couplings and stop-valves for pipes, but more particularly designed for use in connection with the feed-water pipes between the engine and tender of a railway-locomotive, and with this account of the objects of this invention we for clearness connect a statement of the difficulties and the necessities it is adapted to provide for.

The first object of the invention, but not the most important, is to form a coupling having a stop-valve in it, so that the flow of the feed-water through the coupling may be regulated by the said valve.

Second. That whereas it is necessary to have a "rose" or strainer in the pipes to strain the feed-water passing from the tender to the boiler and prevent any larger particles of solid matter from passing to the injectors than those that will pass freely through them, as otherwise the injectors will become choked, and although at first sight these strainers seem a very simple matter, yet, when the absolutely-necessary requirements are taken into due consideration, which are caused by the particular circumstances of a locomotive-engine, it will be found that the case is not without difficulty. In the feed-water pipes at present in use a strainer is furnished, which is done by inclosing the strainer in an ordinary "nut-union" coupling, which requires tools to both disconnect and connect it and which operations take considerable time. Also, if the threads of the screws of the union get crossed, which they almost invariably do, by the time they have been opened and closed about five or six times the nut union is about used up. Also, the cock in the coupling, being an ordinary tapered plug-cock, is affected by the expansion caused by heat and often becomes perfectly stuck fast so that it cannot be moved. Also, to open and close the said plug-cock full from shut requires it to be revolved one-quarter part of a revolution, whereas in the present invention the valve $q'$ may be opened full from perfectly shut by a one-sixth part of a revolution. This may not seem to be a matter of any importance; but in practice it is found so because these valves and cocks are mainly worked by the foot of the engine-driver, and the space in which they are located is very confined, rendering the above-mentioned difference important. To open and close one of the said nut unions and clean the strainer is an operation which must be often done, and takes about ten minutes of time and often over fifteen, and this operation must be done at a stop or station when the engine is stationary, and at such places the parties in charge of the engine often have all they can do to look after the other parts of the engine during the time that is at their disposal without detaining the train, unless, indeed, (which sometimes takes place,) a special stop on the road between stations has to be made, as the engine must stop if the feed-water cannot be supplied to the boiler. Now, therefore, the said second object of our invention is to overcome all these said objections and to provide a construction which can be taken apart and connected together, without any fear of damaging it, almost an unlimited number of times, and this operation can be accomplished in one minute of time, instead of ten and over ten minutes; also, to provide such a construction as cannot be affected by any expansion caused by heat.

The third object of our invention is to so situate the strainer that by taking the coupling apart the strainer will at once fall out, and such fall will give it in most cases just about all the cleaning it requires; and not only this, but to so arrange the parts of the coupling that while they hold the strainer in a position suitable for straining the water, and from which position the strainer cannot escape, yet so that the strainer shall have a certain amount of play or stroke in the direction of the travel of the water. The advantage of this play is that by practical operation it has been found that a strainer having play or stroke will only require to be cleaned once to about ten times that one not having "stroke" will have to be cleaned. This is caused in this way: Although there are no means provided for moving the strainer about, and the action of the water, being in one direction, does not have any inclination to cause it, yet the concussion of the engine and vibrations to which it is subject give the strainer the stroke or motion required. This motion of the strainer, if constructed as shown in the drawings, causes it to act as a grinding-mill upon a large number of the particles which come in contact with the edge of the larger part and between this edge and the inner surface of the wall of the flange $d$. Hence the great difference above mentioned in the number of times that such strainers require to be cleaned as compared with those that do not have said motion. Furthermore, it is a great advantage to be able to adjust the amount of motion of the said strainer, because by practical tests it has been proven that if, on the one hand, the motion of the strainer is made too small its grinding action is reduced and the number of times that cleaning of the strainer is required increased. If the stroke of the strainer is made too great, it is liable to jam on some particle of matter, which will hold it stationary until it is removed. We attain the said objects by the coupling illustrated in the accompanying drawings, in which similar letters of reference indicate like parts, and in which—

Figure 1 is a side elevation of the combined coupling. Fig. 2 is a part elevation and part vertical longitudinal sectional view of the combined coupling, the sectional part of the figure being taken at line $x\ x$, Fig. 3. Fig. 3 is a plan of the entire combined coupling. Fig. 4 is a plan of the under side of the head $b$ detached. Fig. 5 is a plan of the under side of the valve $q$ detached. Fig. 6 is a plan of the head $b'$ detached. Fig. 7 is a vertical central section of the rose or strainer $f$ on a larger scale. Fig. 8 is a modification of the groove $d'$.

The coupling is made in two parts, one male and the other female, which unite together. These parts will be separately described.

Taking first the male part, letter $a$ is a sleeve made integral with a head $b$, having a passage $c$ throughout. This head is provided with a downwardly-projecting circular flange $d$.

$g$ is an arm made integral with the sleeve $a$, extending under the head $b$ and terminated in an eye $h$, screwed to receive a set-screw $i$, the parts being so arranged that an extension of the axis of the set-screw will pass through the center of the circle upon which the flange $d$ is formed.

$k$ is a jam-nut for securing the set-screw $i$. The set-screw and jam-nut will be provided with levers for turning them.

In the head $b$ a diaphragm is formed provided with openings $m$ and forming a valve-seat $l$. On the upper side of the head $b$ a stuffing-box and gland $n$ are attached to hold the valve-spindle $o$, which, as shown, is provided with a flat valve $q$, made integral with the spindle (or not, as desired,) and provided with ports $r$, agreeing with the ports $m$ of the valve-seat $l$, so that by turning the spindle the sixth part of a revolution the ports may be opened their full amount from completely shut.

$e$ is a spring for pressing the valve $q$ upon its seat.

A lever $s$ is shown as attached to the spindle $o$ for turning it by the hand or foot, as desired.

The female part of the coupling consists of a sleeve $a'$, made integral with a circular head $b'$, having a passage $c'$ extending through the two. In the head $b'$ a circular groove $d'$ is formed to receive freely the flange $d$, and in this groove is placed a packing or rubber washer $e'$ to form a tight joint between the two by pressing them together with the set-screw $i$. If desired, the groove $d'$ may be made slightly dovetailed, so that the rubber washer or packing by use will be pressed to this shape and thereby prevented from falling out when the coupling is disconnected.

$f$ is a rose or strainer situated in the coupling, as shown in Fig. 2.

The two parts of the combined coupling thus united are able to move to various angles, as indicated by the dotted lines in Fig. 3, and may even be moved to such a position that their center lines $x\ x$ will be at an acute angle with each other.

With regard to the sleeves $a\ a'$, it is to be remarked that the sleeve $a$ will always be attached to that end of the pipe from which the supply of water proceeds.

When the rose $f$ requires to be cleaned, the valve $q$ is caused to close the ports $m$. The coupling is then disconnected by slacking the screw $i$, and can then be at once taken apart; also, by adjusting the valve $q$ the flow of water through the coupling may be regulated.

It will be observed that the space between the under side of the diaphragm $l$ and the upper surface of the inner wall, forming the groove $d'$ for the packing $e$, are at a much greater distance apart than the thickness of the metal in the strainer $f$, so that while the strainer is held in a position so that the water must be strained in passing it, yet the strainer is able to move up and down or make strokes the length of the said space. This motion of the strainer is caused by the jolting of the locomotive-engine when running over the road and will cause many particles of solid matter in the water to be ground between the periphery of the edge of the largest part of the strainer $f$ and the inner surface of the flange $d$. Again, by increasing the thickness of the packing $e'$ the above-mentioned space and consequent stroke of the strainer $f$ will be correspondingly increased. This is self-evident; but it has been found by practical operation that it is not advisable to make the stroke of the strainer too great, because it then becomes joined on some particle and held stationary until the coupling is cleaned. On the other hand, by decreasing the thickness of the packing $e'$ the stroke of the strainer is correspondingly decreased, and if made too small the said grinding action is reduced.

The only way we at present know for finding the best amount of stroke to be allowed to a strainer is actual trial and observation, as two constructions apparently alike will work best with very different amounts of stroke.

What we claim is as follows:

1. The combination, in a pipe-coupling, of the sleeve $a$, provided with an arm $g$, and set-screw $i$, also having head $b$, provided with a flange $d$, adapted to form a joint with the packing $e'$, provided in thickness to give the desired play to the strainer $f$ and having valve-seat $l$, adapted to govern the play of the strainer in the one direction with the sleeve $a'$, having a head $b'$, provided with a packing-recess $d'$, and packing $e'$, also having the inner wall of the packing-recess adapted to govern the play of the strainer in the other direction with strainer $f$, adapted to be operated as described, the whole substantially as set forth.

2. The combination, in a combined pipe-coupling and stop-valve, of the sleeve $a$, provided with an arm $g$, and set-screw $i$, also having head $b$, provided with a flange $d$, adapted to form a joint with the packing $e'$, being further provided with a valve-seat $l$, which also governs the play of the strainer $f$ in the one direction, a separate part, as shown, forming a gland and stuffing-box $n$, valve $q$, having valve-spindle $o$, a spring $e$, with sleeve $a'$, having head $b'$, provided with packing-recess $d'$, and packing $e'$, provided in thickness to give the desired play to the strainer $f$ and having the inner wall of the packing-recess adapted to form a shoulder to govern the play of the strainer in the other direction, the whole substantially as described.

FELIX LOUIS DECARIE.
PETER LORD.

Witnesses:
GEO. R. LIGHTHALL,
CHARLES G. C. SIMPSON.